United States Patent Office 3,539,881
Patented Nov. 10, 1970

3,539,881
ELECTROLYTIC CAPACITOR CONTAINING AN ORGANIC ACID-BASE AZEOTROPIC MIXTURE AS THE ELECTROLYTE
Daniel J. Anderson, Indianapolis, Ind., assignor to P. R. Mallory & Co. Inc., Indianapolis, Ind., a corporation of Delaware
No Drawing. Continuation-in-part of application Ser. No. 581,149, Sept. 22, 1966. This application July 9, 1969, Ser. No. 840,525
Int. Cl. H01g 9/02
U.S. Cl. 317—230          21 Claims

ABSTRACT OF THE DISCLOSURE

A capacitor comprising a binary organic system which forms in the correct proportions an azeotropic composition having a boiling point higher than that of either of the system's pure components.

---

This application is a continuation-in-part of application Ser. No. 581,149 filed Sept. 22, 1966, now abandoned.

Prior to this invention, existing capacitor electrolytes were for the most part, based on ethylene glycol as a solvent. With this solvent, unless water is added to the electrolyte, the resistance of the electrolyte will be relatively high, and the capacitance of the capacitor made with the electrolyte will fall off sharply at temperatures of about −40° C. or below. If water is added to the electrolyte, the stability of the capacitor on life test is usually adversely affected. In addition, capacitor failures due to the buildup of internal pressures are more likely to occur.

In some previous work that has been done in attempts to solve this problem, glycol ethers have been used as the solvents. Also, work has been done with dimethylformamide, nitriles and other organic solvents. While these solvents will function well in capacitors having good sealing characteristics, their use has proven impractical in many applications where electrolyte vapor pressure is a problem; that is, in applications where diffusion through the casing material and end seals leads to a gradual loss in the quantity of electrolyte remaining in the capacitor.

It is, therefore, an object of the present invention to provide an electrolyte of low volatility for a capacitor which is operable at wide temperature ranges, up to +85° C. and higher.

It is another object of the present invention to provide a capacitor which is operable at low temperatures such as, as low as −40° and lower.

It is another object of the invention to provide an electrolyte for a capacitor in which the sealing characteristics are not of the highest quality.

Another object of the invention is to provide a capacitor electrolyte which has good shelf life.

The invention in its broadest aspect contemplates providing an electrolyte from an organic system which forms, in the correct proportions, an azeotropic, or constant-boiling composition, having a boiling point higher than that of any of the system's pure components.

It has long been known that constant boiling mixtures are formed with many binary or ternary organic systems. In most cases, the boiling point of the azeotrope is less than that of either pure component. Such a mixture would have a high vapor pressure, thus making the capacitor characteristics readily susceptible to loss of the electrolyte. This type of mixture would, therefore, be of little value in an electrolyte for a capacitor.

In accordance with the present invention, an electrolyte is formed from an organic acidic material and a basic material, both of which are liquid, and which are so proportioned that the boiling point of the mixture is higher than that of any of the pure components of the system. When an organic acidic material and an organic basic material, both of which are liquids, comprise the system, intermolecular attraction results in such an azeotrope. Capacitors in which the electrolyte is used will deteriorate substantially less through the loss of an individual component of the electrolyte. Rather, because of the increased boiling point, the vapor pressure of the mixture is lowered thus causing the electrolyte to be more stable. Any losses of acidic and basic constituents from the electrolyte will be in about the same ratio as found in the electrolyte, hence the electrolyte composition will remain stable, even though the total amount of electrolyte may be gradually diminished.

The acidic materials to be used in the electrolyte of the present invention are liquid organic acidic materials. Most of the acidic materials to be used in accordance with the present invention will have the formula RCOOH, wherein R may be hydrogen, alkyl, or alkylene, straight or branched chains. Preferably R is H, lower alkyl or lower alkylene with 1 to 6 carbon atoms. Exemplary acids include formic, acetic, propionic, propenoic, butenoic and pentenoic acids. Additionally, non-chloride substitution may take place. For example, trifluoroacetic acid may be used.

Another acidic material which may be used is phenol $C_6H_5OH$ and lower alkyl substituted phenols, preferably having 1 to 3 carbon atoms.

The basic substances may be generally divided into two groups, those having the formula

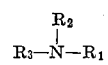

wherein $R_1$, $R_2$, $R_3$ may be hydrogen, alkyl or alkylene, with straight or branched chains. Preferably, $R_1$, $R_2$ and $R_3$ are H, lower alkyl or lower alkylene groups having 1 to 6 carbon atoms. Additionally, non-chloride substitution of the alkyl or alkylene chain may be had. For example, fluoride may be substituted onto the chains.

The second group of basic materials may be classified heterocyclic nitrogen containing compounds. For example, pyridine and substituted pyridine compounds may be utilized. Likewise, pyrroles and substituted pyrroles may be utilized. The substituents on the pyridine and pyrrole type compounds (other items H) are alkylene or alkyl, preferably lower, most preferably having 1 to 4 carbon atoms. Also, the presence of one or more non-chloride substituents would not be disadvantageous. Examples include methyl substituted pyridines including 2-picoline, 3-picoline, 4-picoline, 2-ethyl pyridine, 3-propylpyridine, 4-butyl pyridine. Likewise, methyl, ethyl and propyl groups, preferably no more than one, may be substituted onto the pyrrol molecules.

Tabulated below in Table I are several examples of organic acidic material and organic basic materials which may be used which will yield the desired azeotropic mixtures with their boling points and the boiling points of the mixtures.

TABLE I

| A | B | B.P. of A[1] | B.P. of B[1] | B.P. of azeotrope [1] |
|---|---|---|---|---|
| Acetic acid | Triethylamine | 118 | 90 | 163 |
| Do | Trimethylamine | 118 | 3.5 | 148–150 |
| Do | Pyridine | 118 | 115 | 139–141 |
| Propionic acid | Triethylamine | 141 | 90 | 168 |
| Do | Pyridine | 141 | 115 | 148–150 |
| Phenol | 4-picoline | 182 | 143 | 190 |

[1] Degrees centigrade.

In order to achieve the azeotrope with the higher boiling point, the proportion of acid to base should be carefully controlled. Presented in tabular form in Table II, the preferred proportions by weight are as follows:

TABLE II

| A | B | Ratio of A to B |
|---|---|---|
| Acetic acid | Triethylamine | 69:31 |
| Do | Trimethylamine | 80:20 |
| Do | Pyridine | 53:47 |
| Propionic acid | Triethylamine | 73:27 |
| Do | Pyridine | 74:26 |
| Phenol | 4-picoline | 65.5:34.5 |

The proportions of other compounds falling within the acidic and basic substances of the present invention can either be determined from data tabulated in handbooks or simple experiments may be carried out to determine the azeotropic mixture composition and whether or not the boiling point of the azeotropic mixture is higher than the boiling point of the components. It is only in the latter event that the composition is intended to fall within the scope of the present invention.

While the present electrolyte has been found to be quite adaptable to operation in a wide temperature range, including for example, about +85° C. and higher to below about −40° C. without major deterioration of the capacitor, it has been found that in order to improve the electrolyte's shelf life (periods when not in use), a minor amount of an inhibitor may be added when the electrolyte is to be used in applications requiring considerable shelf life. To this end, it has been found that, for the above acidic and basic materials, phosphoric phosphinic or phosphorous acid or soluble (in the electrolyte) organic or inorganic salts such as phosphates, phosphonates, phosphites may be added to improve the shelf life of the electrolyte. Preferably the amount added is based on the amount of azeotrope, from about 0.1% to 1% by weight.

The electrolyte of the present invention can be utilized in a wide range of capacitors. The electrolyte can be used in impregnated type capacitors wherein paper, cellulosic fiber, or polymeric separators may be used. The separtors are, as is well known, placed between film-forming metal electrodes. While the film-forming metal may be any of the known metals for this purpose including titanium, zirconium, niobium; tantalum and aluminum are preferred. The impregnated capacitor may be of the flat type or of the wound type.

The electrolyte can also be used in the wet type of capacitor. The anode may be made of any of the above-mentioned film-forming metals. The can may be made of a film-forming metal, or another metal such as silver or gold and if desired may be reinforced with another metal, for example steel, including stainless, copper or copper alloys.

EXAMPLE I

An electrolyte having the following composition was prepared. The composition was prepared by mixing the constituents in a suitable beaker in liquid form.

| | Grams |
|---|---|
| Glacialacetic acid | 138 |
| Triethylamine | 62 |
| 85% phosphoric acid | 1 |

The electrolyte was introduced into a 3/8" diameter aluminum case coax axial lead capacitor of 15/16" length. The end seal was made of molded phenolic material, with a rubber O-ring gasket. The capacitor was rated at 35 mfd. at 30 volts.

The capacitors were then tested with the following results tabulated below. In the data the following nomenclature is used:

C=capacitance in microfarads
DF (percent)=percent dissipation factor
IDC=direct current leakage at rated voltage measured after 3 min. electrification (A) LIFE TEST DATA

| | Initial | 500 hours 85° C. | 1,000 hours at 85° C. |
|---|---|---|---|
| C | 45.2 | 44.4 | 44.4 |
| DF (percent) | 3.6 | 3.6 | 3.41 |
| IDC (a.) | 4.4 | 0.4 | 0.20 |

(B) SHELF LIFE TEST DATA

| | Initial | 500 hours at 85° C. |
|---|---|---|
| C | 45.6 | 43.3 |
| DF (percent) | 3.6 | 3.05 |
| IDC (a.) | 3.6 | 10.8 |

(C) LOW TEMPERATURE CHARACTERISTICS

| | 25° C. | −30° C. | −40° C. | −55° C. |
|---|---|---|---|---|
| C | 45.2 | 40.9 | 38.2 | 25.5 |
| DF (percent) | 3.6 | 34 | 65 | 234 |

EXAMPLE II

Using the same electrolyte composition as in Example I, of glacialacetic acid and triethylamine, another group of capacitors, rated 8 mfd. at 60 volts, was prepared in a molded plastic axial lead construction. Results of testing on this group are as follows:

(A) LIFE TEST

| | Initial | 500 hours at 85° C. |
|---|---|---|
| C | 8.41 | 8.18 |
| DF (percent) | 6.5 | 6.7 |
| IDC (a.) | 3.7 | 0.42 |

(B) SHELF LIFE TEST

| | Initial | 500 hours at 85° C. |
|---|---|---|
| C | 8.19 | 7.84 |
| DF (percent) | 6.7 | 6.7 |
| IDC (a.) | 1.8 | 3.5 |

From the test data and the foregoing description it is apparent that the present invention provides a novel electrolyte which gives good oparting characteristics for capacitors operating in a wide temperature range, of as high as 85° C. and above to as low as −40° C. and below.

As many different embodiments of this invention may be made without departing from the spirit and scope hereof, it is to be understood that the invention is not limited to the specific embodiments hereof, except as defined in the appended claims and in accordance with the doctrin of equivalents.

What is claimed is:
1. A capacitor comprising:
   at least one first electrode made of a film-forming metal selected from the group consisting of tantalum, niobium, zirconium, titanium and aluminum, having a dielectric oxide thereon;
   at least one second electrode made of a conductive material; and
   an electrolyte in contact with said dielectric oxide and said second electrode;
      said electrolyte consisting essentialy of an organic system composed of a liquid organic acidic material selected from the group consisting of acids having the formula RCOOH, where R is selected from group consisting of hydrogen, loweralkyl groups having 1 to 6 carbon atoms and lower alkylene groups having 1 to 6 carbon atoms; phenol and phenol substituted with lower alkyl groups having 1 to 3 carbon atoms; and an organic basic material selected from the group consisting of amines having the formula

wherein $R_1$, $R_2$ and $R_3$ are selected from the group consisting of hydrogen, lower alkyl groups having 1 to 6 carbon atoms, and lower alkylene groups having 1 to 6 carbon atoms; pyridine and pyridine substituted with a substituent selected from the group consisting of alkyl and alkylene groups having 1 to 4 carbon atoms; pyrrole and pyrrole substituted with substituents selected from the group consisting of alkyl and alkylene groups having 1 to 4 carbon atoms, said acidic and basic material being in such proportions as to constitute an azeotropic composition having a boiling point higher than the pure components of such system.

2. A capacitor according to claim 1 in which said acidic material is an acid having the formula RCOOH where R is a lower alkyl group having 1 to 6 carbon atoms.

3. A capacitor according to claim 1 wherein said organic basic material is an amine having the formula

wherein $R_1$, $R_2$ and $R_3$ are selected from the group consisting of hydrogen, lower alkyl groups having 1 to 6 carbon atoms and lower alkylene groups having 1 to 6 carbon atoms.

4. A capacitor according to claim 1 wherein said acidic material is selected from phenol and phenol substituted with lower alkyl groups having 1 to 3 carbon atoms.

5. A capacitor according to claim 1 in which said basic material is selected from pyridine and pyridine substituted with a substituent selected from the group consisting of alkylenes and alkyl groups having 1 to 4 carbon atoms.

6. A capacitor according to claim 1 in which said basic material is selected from pyrrole and pyrrole substituted with a substituent selected from the group consisting of alkylenes and alkyl groups having 1 to 4 carbon atoms.

7. A capacitor according to claim 1 in which said capacitor is of the wet electrolyte type.

8. A capacitor according to claim 1 in which the film-forming metal is aluminum.

9. A capacitor according to claim 1 in which the film-forming metal is tantalum.

10. A capacitor according to claim 1 in which between said first and second electrode a separator is placed and said electrolyte is impregnated into said separator.

11. A capacitor according to claim 10 in which said separator is a fibrous material.

12. A capacitor according to claim 11 in which said first and second electrode and said fibrous material are wound in a concentric fashion.

13. A capacitor according to claim 11 in which said fibrous material is selected lfrom the group consisting of paper, cellulose and polymeric separators.

14. A capacitor comprising:
at least one first electrode made of a film-forming metal selected from the group consisting of tantalum, nobium, zirconium, titanium and a aluminum, having a dielectric oxide thereon;
at least one second electrode made of a conductive material; and
an electrolyte in contact with said dielectric oxide and said second electrode;
said electrolyte consisting essentialy of an organic system composed of a liquid organic acidic material selected from the group consisting of acids having the formula RCOOH, where R is selected from group consisting of hydrogen, lower alkyl groups having 1 to 6 carbon atoms and lower alkylene groups having 1 to 6 carbon atoms; phenol and phenol substituted with lower alkyl groups having 1 to 3 carbon atoms; and an organic basic material selected from the group consisting of amines having the formula

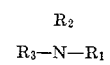

wherein $R_1$, $R_2$ and $R_3$ are selected from the group consisting of hydrogen, lower alkyl groups having 1 to 6 carbon atoms, and lower alkylene groups having 1 to 6 carbon atoms; pyridine and pyridine substituted with a substituent selected from the group consisting of alkyl and alkylene groups having 1 to 4 carbon atoms; pyrrole and pyrrole substituted with substituents selected from the group consisting of alkyl and alkylene groups having 1 to 4 carbon atoms; said acidic and basic material being in such proportions as to constitute an azeotropic composition having a boiling point higher than the pure components of such system; and a phosphorous material selected from the group consisting of phosphoric, phosphorous and phosphinic acids, soluble salts thereof and mixtures thereof up to about 1% by weight of the azeotropic mixture.

15. A capacitor according to claim 14 wherein said acidic material is an acid having a formula RCOOH, wherein R is a lower alkyl group having 1 to 6 carbon atoms.

16. A capacitor according to claim 14 in which said basic material is an amine having a formula

wherein $R_1$, $R_2$ and $R_3$ are selected from the group consisting of hydrogen, lower alkyl having 1 to 6 carbon atoms, and lower alkylene groups having 1 to 6 carbon atoms.

17. A capacitor according to claim 14 in which said phosphorous material is phosphoric acid.

18. A capacitor according to claim 14 in which said acidic material is acetic acid.

19. A capacitor according to claim 14 in which said basic material is triethylamine.

20. A capacitor according to claim 14 in which between said first and second electrode a separator is placed and said electrolyte is impregnated into said separator.

21. A capacitor according to claim 20 in which said separator is a fibrous material.

References Cited

UNITED STATES PATENTS

| | | | |
|---|---|---|---|
| 2,155,086 | 4/1939 | Georgier | 317—230 |
| 3,003,089 | 10/1961 | Bernard et al. | 252—62.2 |
| 3,290,561 | 12/1966 | Burnham | 252—62.2 |

OTHER REFERENCES

Van Klooster et al., "Chemical Abstracts," vol. 39, p. 3480 (1945).

Hansley, "Chemical Abstracts," vol. 43, p. 2220 (1949).

Holmberg, "Chemical Abstracts," vol. 55, p. 7967 (1961).

TOBIS E. LEVOW, Primary Examiner

J. COOPER, Assistant Examiner

U.S. Cl. X.R.

252—62.2

UNITED STATES PATENT OFFICE
CERTIFICATE OF CORRECTION

Patent No. 3,539,881                  Dated November 10, 1970

Inventor(s) Daniel J. Anderson

It is certified that error appears in the above-identified patent and that said Letters Patent are hereby corrected as shown below:

In column 2, line 30, after "atoms", before the "." ----on the alkyl group---- is inserted.

In column 2, line 47, within the parentheses "items" is changed to ----than----.

In column 2, line 59, "boling" is changed to ----boiling----.

In column 3, line 32, a ----comma (,)---- is inserted between "phosphoric" and "phosphinic".

In column 4, line 47, "oparting" is changed to ----operating----.

In claim 1, column 5, lines 4 and 5, a single bond line is inserted in the formula between "$R_2$" and "N".

In claim 3, column 5, lines 27 and 28, a single bond line is inserted in the formula between "N" and "$R_2$".

In claim 14, column 6, lines 9 and 10, a single bond line is inserted in the formula between "N" and "$R_2$".

In claim 16, column 6, lines 39 and 40, a single bond line is inserted in the formula between "N" and "$R_2$".

Signed and sealed this 27th day of April 1971.

(SEAL)
Attest:

EDWARD M. FLETCHER, JR.          WILLIAM E. SCHUYLER, JR.
Attesting Officer                   Commissioner of Patents